US008910291B2

(12) United States Patent
Haviv et al.

(10) Patent No.: US 8,910,291 B2
(45) Date of Patent: Dec. 9, 2014

(54) BLACK-BOX TESTING OF WEB APPLICATIONS WITH CLIENT-SIDE CODE EVALUATION

(75) Inventors: Yinnon A. Haviv, Beerotaim (IL); Daniel Kalman, Herzliya (IL); Dmitri Pikus, Herzliya (IL); Omer Tripp, Herzliya (IL); Omri Weisman, Herzliya (IL)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 13/430,013

(22) Filed: Mar. 26, 2012

(65) Prior Publication Data

US 2013/0007887 A1 Jan. 3, 2013

Related U.S. Application Data

(63) Continuation of application No. 13/170,839, filed on Jun. 28, 2011.

(51) Int. Cl.
*H04L 29/06* (2006.01)
*G06F 21/57* (2013.01)

(52) U.S. Cl.
CPC .......... *G06F 21/577* (2013.01); *H04L 63/1433* (2013.01)
USPC .......................................................... 726/25

(58) Field of Classification Search
USPC .......................................................... 726/25
See application file for complete search history.

(56) References Cited

U.S. PATENT DOCUMENTS

| 7,451,352 | B1 * | 11/2008 | Moore et al. ............... 714/38.14 |
| 7,788,235 | B1 * | 8/2010 | Yeo .............................. 707/687 |
| 7,870,610 | B1 * | 1/2011 | Mitchell et al. ................. 726/23 |
| 8,135,994 | B2 * | 3/2012 | Keromytis et al. ........ 714/38.11 |
| 2006/0195588 | A1 | 8/2006 | Pannington et al. |
| 2008/0320567 | A1 * | 12/2008 | Shulman et al. ................... 726/4 |
| 2009/0282480 | A1 | 11/2009 | Lee et al. |
| 2010/0106767 | A1 | 4/2010 | Livshits et al. |
| 2010/0169974 | A1 | 7/2010 | Calendino et al. |
| 2010/0325359 | A1 * | 12/2010 | Goel et al. ..................... 711/125 |
| 2011/0145918 | A1 * | 6/2011 | Jung et al. ........................ 726/22 |
| 2011/0252475 | A1 * | 10/2011 | Mui et al. ......................... 726/23 |
| 2012/0210415 | A1 * | 8/2012 | Somani et al. ..................... 726/9 |
| 2012/0210423 | A1 * | 8/2012 | Friedrichs et al. .............. 726/22 |

OTHER PUBLICATIONS

Huang, Y., et al., "A Testing Framework for Web Application Security Assessment", Computer Networks: The Int'l Journal of Computer and Telecommunications Networking, vol. 48, Issue 5 (Aug. 2005), Publisher: Elsevier North-Holland, Inc.
Saxena, P., et al., "A Symbolic Execution Framework for JavaScript", In Proc. of the 31st IEEE Symposium on Security and Privacy (Oakland 2010).

(Continued)

*Primary Examiner* — Michael S McNally
(74) *Attorney, Agent, or Firm* — Cuenot, Forsythe & Kim, LLC

(57) ABSTRACT

Detecting security vulnerabilities in web applications by interacting with a web application at a computer server during its execution at the computer server, identifying client-side instructions provided by the web application responsive to an interaction with the web application, where the client-side instructions are configured to be implemented by a client computer that receives the client-side instructions from the computer server, evaluating the identified client-side instructions, and identifying a security vulnerability associated with the client-side instructions.

10 Claims, 7 Drawing Sheets

(56) References Cited

OTHER PUBLICATIONS

Saxena, P., et al., "FLAX: Systematic Discovery of Client-side Validation Vulnerabilities in Rich Web Applications", 2009.

Petukhov, A. et al., "Detecting Security Vulnerabilities in Web Applications Using Dynamic Analysis with Penetration Testing", OWASP Application Security Conference, 2008.

* cited by examiner

```
<HTML>
<TITLE>Welcome!</TITLE>
Hi

<SCRIPT>
var name = document.URL;;
var sanitizedName = name.substring(2);
document.write(sanitizedName);
</SCRIPT>

Welcome to our system
</HTML>
```

Fig. 2A

```
<HTML>
<TITLE>Welcome!</TITLE>
Hi
<SCRIPT>
String.prototype.taint = false;

// Taint sources (field access)
function isSource(obj) {return obj == document.URL ||
                    obj == document.referrer ||
                    obj == document.URLUnencoded ||
                    obj == document.location ||
                    obj == document.location.href ||
                    obj == document.location.hash ||
                    obj == document.location.search ||
                    obj == window.location ||
                    obj == window.location.href ||
                    obj == window.location.hash ||
                    obj == window.location.search;} function isTainted(obj) {return obj.taint || isSource(obj);} function taintWrapper(func) {
           return function() {var rc = new String(func.apply(this,arguments));
                    if ( isTainted(this) )
                            rc.taint = true;
                    return rc;}
} function sinkWrapper(func, issueType) {
           return function() {var rc = func.apply(this,arguments);
                    if ( isTainted( arguments[0] ) )
                       alert(issueType);
                    return rc;}
}

// Taint propogators
String.prototype.substring = taintWrapper(String.prototype.substring);

// Sink methods
document.write = sinkWrapper( document.write, "DOM-based XSS" );

</SCRIPT>

<SCRIPT>
var name = document.URL;;
var sanitizedName = name.substring(2);
document.write(sanitizedName);
</SCRIPT>

Welcome to our system
</HTML>
```

Fig. 2B

BLACK-BOX TESTING OF WEB APPLICATIONS WITH CLIENT-SIDE CODE EVALUATION

CROSS-REFERENCE TO RELATED APPLICATIONS

This application is a Continuation of U.S. application Ser. No. 13/170,839, filed on Jun. 28, 2011, the entirety of which is incorporated herein by reference.

FIELD OF THE INVENTION

The invention relates to computer software analysis and testing in general.

BACKGROUND OF THE INVENTION

Internet-based computer software applications, or "web" applications, are often tested to determine whether they are vulnerable to malicious attacks or otherwise show signs of security vulnerabilities. One such type of testing known as "black-box" testing involves executing a web application, interacting with the application's interfaces, such as by using known forms of malicious attacks, and then searching for evidence that an interaction exposed a known type of vulnerability. Interactions with some types of web applications will often cause such web applications to return software instructions known as "client-side code" to an interacting party, where the client-side code is configured to be executed by the interacting party's, or "client's", computer. Unfortunately, black-box testing of a web application that is executed by a computer server, where the black-box interactions with the web application are effected only at the server side, cannot identify security vulnerabilities in such client-side code.

SUMMARY OF THE INVENTION

An embodiment can include a method for detecting security vulnerabilities in web applications. The method can include interacting with a web application at a computer server during its execution at the computer server, identifying client-side instructions provided by the web application responsive to an interaction with the web application, where the client-side instructions are configured to be implemented by a client computer that receives the client-side instructions from the computer server, evaluating the client-side instructions, and identifying a security vulnerability associated with the client-side instructions.

BRIEF DESCRIPTION OF THE DRAWINGS

The invention will be understood and appreciated more fully from the following detailed description taken in conjunction with the appended drawings in which:

FIGS. 2A and 2B show sample code before and after modification in support of dynamic taint analysis of client-side code in accordance with an embodiment of the invention;

DETAILED DESCRIPTION OF THE INVENTION

Figure 1:
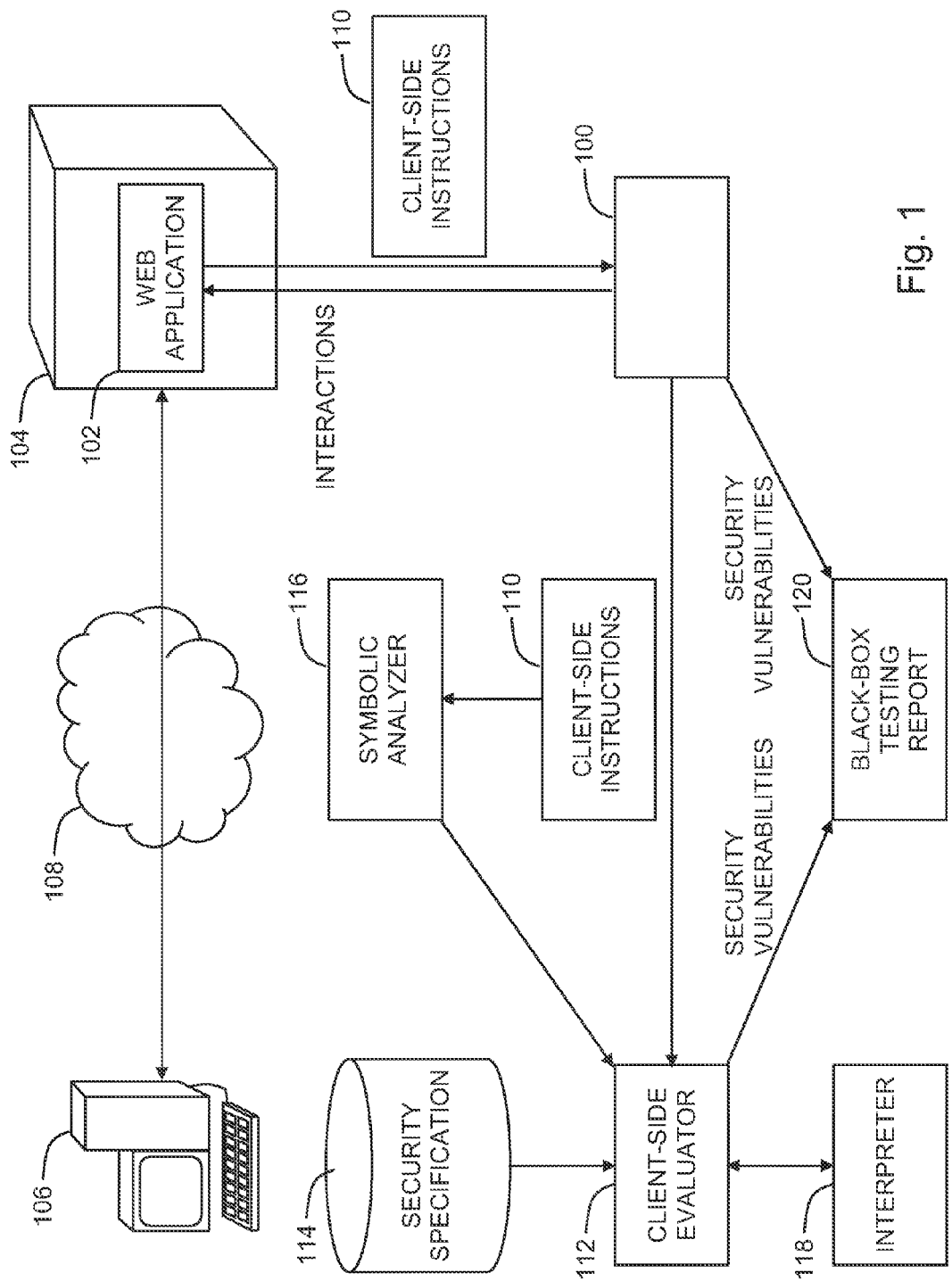
FIG. 1 is a simplified conceptual illustration of a system for black-box testing of web applications with client-side code evaluation, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a system for black-box testing of web applications with client-side code evaluation, constructed and operative in accordance with an embodiment of the invention. In the system of FIG. 1 a black-box tester 100, such as IBM Rational AppScan™, commercially-available from International Business Machines Corporation, Armonk, N.Y., is configured to interact with a web application 102 during its execution in accordance with conventional black-box testing techniques, such as to identify any security vulnerabilities within web application 102, as well as to identify any statically or dynamically generated web pages exposed by web application 102. Web application 102 may be any computer-based software application that may be hosted by a computer server, such as a computer server 104, and accessed by one or more client computers, such as a client computer 106, via a computer network 108, such as the Internet. Black-box tester 100 is preferably configured to identify client-side instructions 110 provided by web application 102 responsive to an interaction with web application 102 that was initiated by black-box tester 100. Client-side instructions 110 may, for example, be JavaScript™ or Flash™ ActionScript™ code that is configured to be implemented by a client computer that receives client-side instructions 110 from a computer server where web application 102 is hosted.

A client-side evaluator 112 is preferably configured to evaluate client-side instructions 110 identified by black-box tester 100 and identify any security vulnerabilities within client-side instructions 110. In one embodiment client-side evaluator 112 is configured to perform static analysis of client-side instructions 110 in accordance with conventional techniques to identify security vulnerabilities within client-side instructions 110.

In another embodiment client-side evaluator 112 is configured to perform dynamic taint analysis on client-side instructions 110 in accordance with conventional techniques to identify security vulnerabilities within client-side instructions 110 by tracking taint propagation within client-side instructions 110. In order to perform the dynamic taint analysis, client-side evaluator 112 is preferably configured to modify client-side instructions 110 to store information indicating whether variables within the client-side instructions point to tainted objects. For example, FIG. 2A shows sample HTML and JavaScript™ code that is vulnerable to DOM-based Cross-Site Scripting attacks, while FIG. 2B shows the sample code of FIG. 2A after modification, in which A list of security sources, such as are provided in a predefined security specification, is added under function 'is Source'.

A Boolean field 'taint' is added to types of interest (e.g., 'String').

Taint propagation is accomplished via function 'taintWrapper' by wrapping relevant functions (e.g., String APIs) and setting the 'taint' field to 'true' where (i) there is use-to-def data flow, or (ii) the statement is a source call. Use-to-use flow may also be handled using the same mechanism.

Security violations are discovered by wrapping sink calls (e.g., by calling function 'sinkWrapper'). Sinks are identified according to the security specification.

These modifications may be implemented when the dynamic taint analysis is performed, where the only information required in advance is the security specification including information about taint propagation.

Client-side evaluator 112 is configured to perform dynamic taint analysis on the modified code of FIG. 2B by executing the modified code and tracing its execution flow to determine whether the contents of variables that have been labeled as tainted variables flow to security-sensitive sinks without losing their tainted status along the way. Client-side evaluator 112 is preferably configured to use a predefined security specification 114 to determine which objects within client-side instructions 110 are tainted and how taint propagates from variable to variable within client-side instructions 110. A symbolic analyzer 116 may optionally be employed that is configured to perform symbolic analysis of client-side instructions 110 to determine values for any variables within client-side instructions 110 that would result in a control flow target being reached within client-side instructions 110 during execution of client-side instructions, such as to a security-sensitive sink. Client-side evaluator 112 may be configured to use any values determined by symbolic analyzer 116 when performing the dynamic taint analysis on client-side instructions 110 that would result in a control flow target being reached.

In another embodiment, client-side evaluator 112 is configured to perform dynamic taint analysis on client-side instructions 110 without modifying client-side instructions 110. Rather, client-side evaluator 112 executes client-side instructions 110 by calling an interpreter 118 which is configured to track any variable within client-side instructions 110 that directly points to a tainted object within client-side instructions 110, and preferably any variable that ultimately depends from any variable within client-side instructions 110 that directly points to a tainted object within client-side instructions 110. Interpreter 118 is preferably configured to use security specification 114 to determine which objects within client-side instructions 110 are tainted and how taint propagates from variable to variable within client-side instructions 110. Thus, client-side evaluator 112 in conjunction with interpreter 118 identifies security vulnerabilities within client-side instructions 110 by tracking taint propagation within client-side instructions 110. Symbolic analyzer 116 may optionally be employed as described above in conjunction with client-side evaluator 112.

Any security vulnerabilities that are identified by client-side evaluator 112 within client-side instructions 110 are preferably added to a black-box testing report 120 produced by black-box tester 100 which preferably reports any security vulnerabilities that are identified by black-box tester 100 within web application 102.

Figure 3:
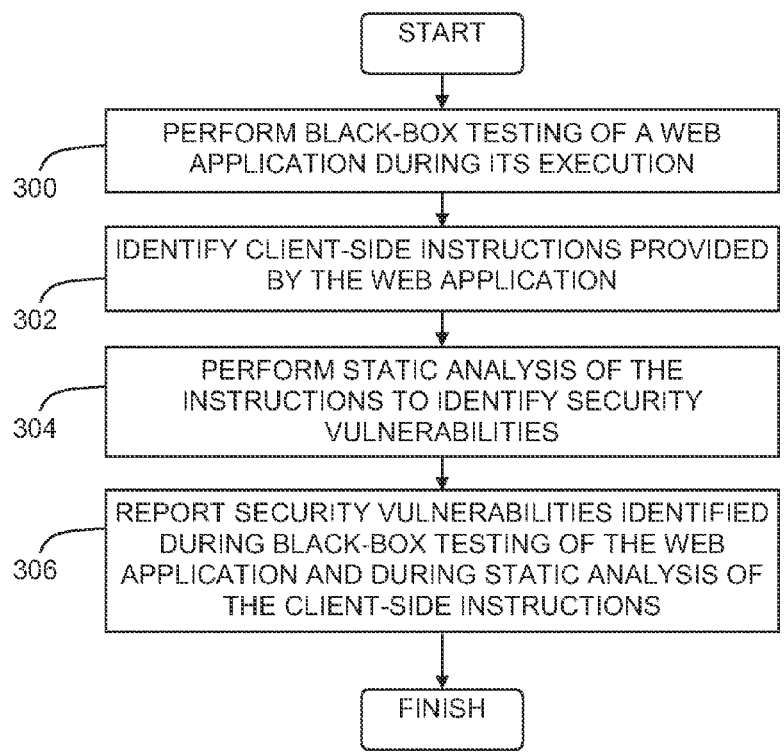
FIG. 3 is a simplified flowchart illustration of an exemplary method of operation of the system of FIG. 1, operative in accordance with an embodiment of the invention.

Reference is now made to FIG. 3 which is a simplified flowchart illustration of an exemplary method of operation of the system of FIG. 1, operative in accordance with an embodiment of the invention. In the method of FIG. 3, black-box testing of a web application is performed during its execution, such as to identify any security vulnerabilities within the web application (step 300). Client-side instructions provided by the web application are identified responsive to black-box interactions with the web application (step 302), where the instructions are configured to be implemented by a client computer. Static analysis of the instructions is performed to identify any security vulnerabilities within the instructions (step 304). Security vulnerabilities identified during black-box testing of the web application and during static analysis of the client-side instructions are reported (step 306).

Figure 4:
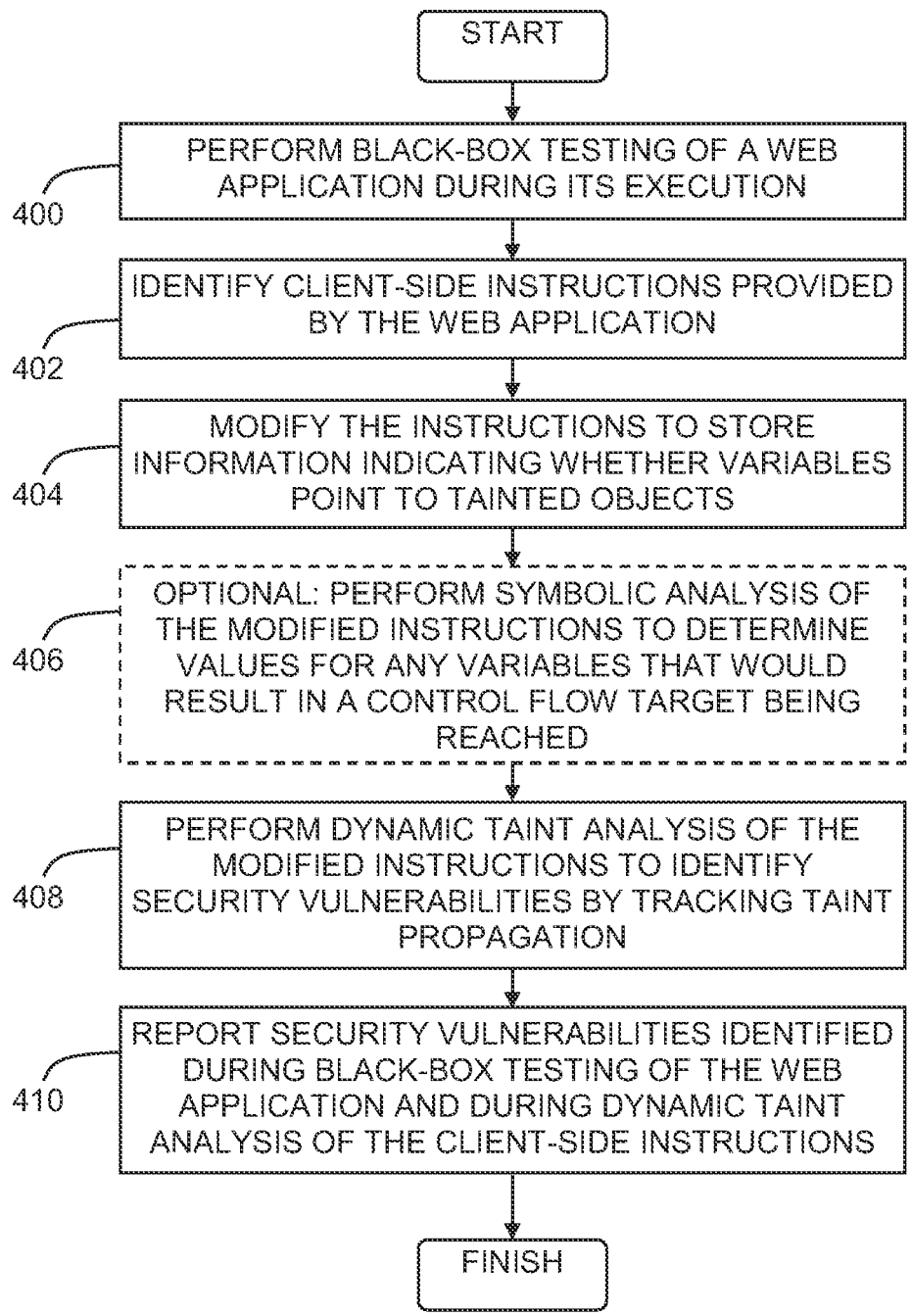
FIG. 4 is a simplified flowchart illustration of an exemplary method of operation of the system of FIG. 1, operative in accordance with an alternative embodiment of the invention.

Reference is now made to FIG. 4 which is a simplified flowchart illustration of an exemplary method of operation of the system of FIG. 1, operative in accordance with an alternative embodiment of the invention. In the method of FIG. 4 black-box testing of a web application is performed during its execution, such as to identify any security vulnerabilities within the web application (step 400). Client-side instructions provided by the web application are identified responsive to black-box interactions with the web application (step 402), where the instructions are configured to be implemented by a client computer. The instructions are modified to store information indicating whether variables within the instructions point to tainted objects (step 404). Symbolic analysis is optionally performed to determine values for any variables within the modified instructions that would result in a control flow target being reached (step 406). Dynamic taint analysis is performed of the modified instructions to identify security vulnerabilities by tracking taint propagation within the instructions (step 408), where values determined during the symbolic analysis may be used if symbolic analysis was performed. Security vulnerabilities identified during black-box testing of the web application and during dynamic taint analysis of the client-side instructions are reported (step 410).

Figure 5:
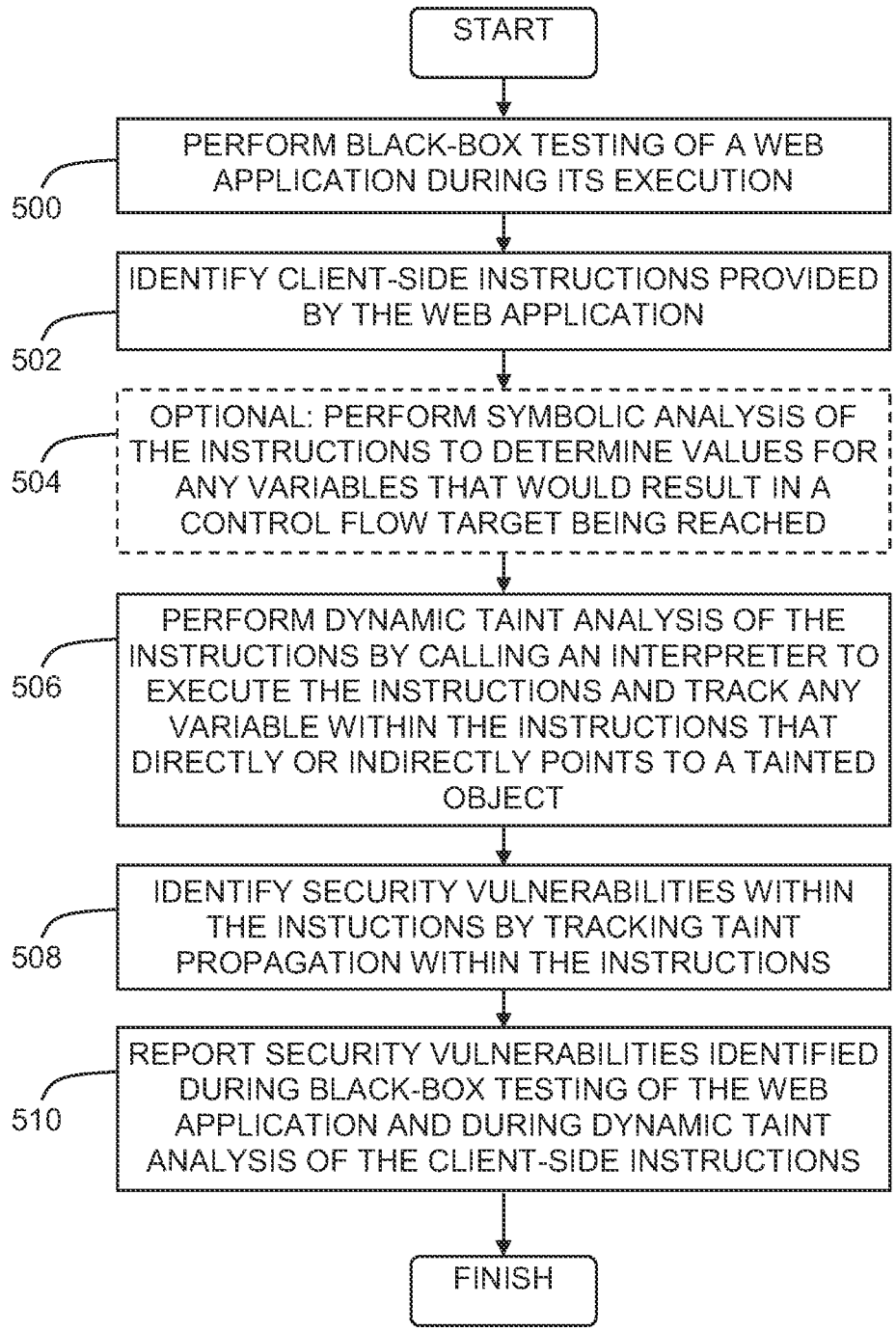
FIG. 5 is a simplified flowchart illustration of an exemplary method of operation of the system of FIG. 1, operative in accordance with an alternative embodiment of the invention.

Reference is now made to FIG. 5 which is a simplified flowchart illustration of an exemplary method of operation of the system of FIG. 1, operative in accordance with an alternative embodiment of the invention. In the method of FIG. 5, black-box testing of a web application is performed during its execution, such as to identify any security vulnerabilities within the web application (step 500). Client-side instructions provided by the web application are identified responsive to black-box interactions with the web application (step 502), where the instructions are configured to be implemented by a client computer. Symbolic analysis is optionally performed to determine values for any variables within the instructions that would result in a control flow target being reached (step 504). Dynamic taint analysis is performed of the instructions by calling an interpreter to execute the instructions, where the interpreter is configured to track any variable within the instructions that directly or indirectly points to a tainted object (step 506) where values determined during the symbolic analysis may be used if symbolic analysis was performed. Security vulnerabilities are identified within the instructions by tracking taint propagation within the instructions (step 508). Security vulnerabilities identified during black-box testing of the web application and during dynamic taint analysis of the client-side instructions are reported (step 510).

Figure 6:
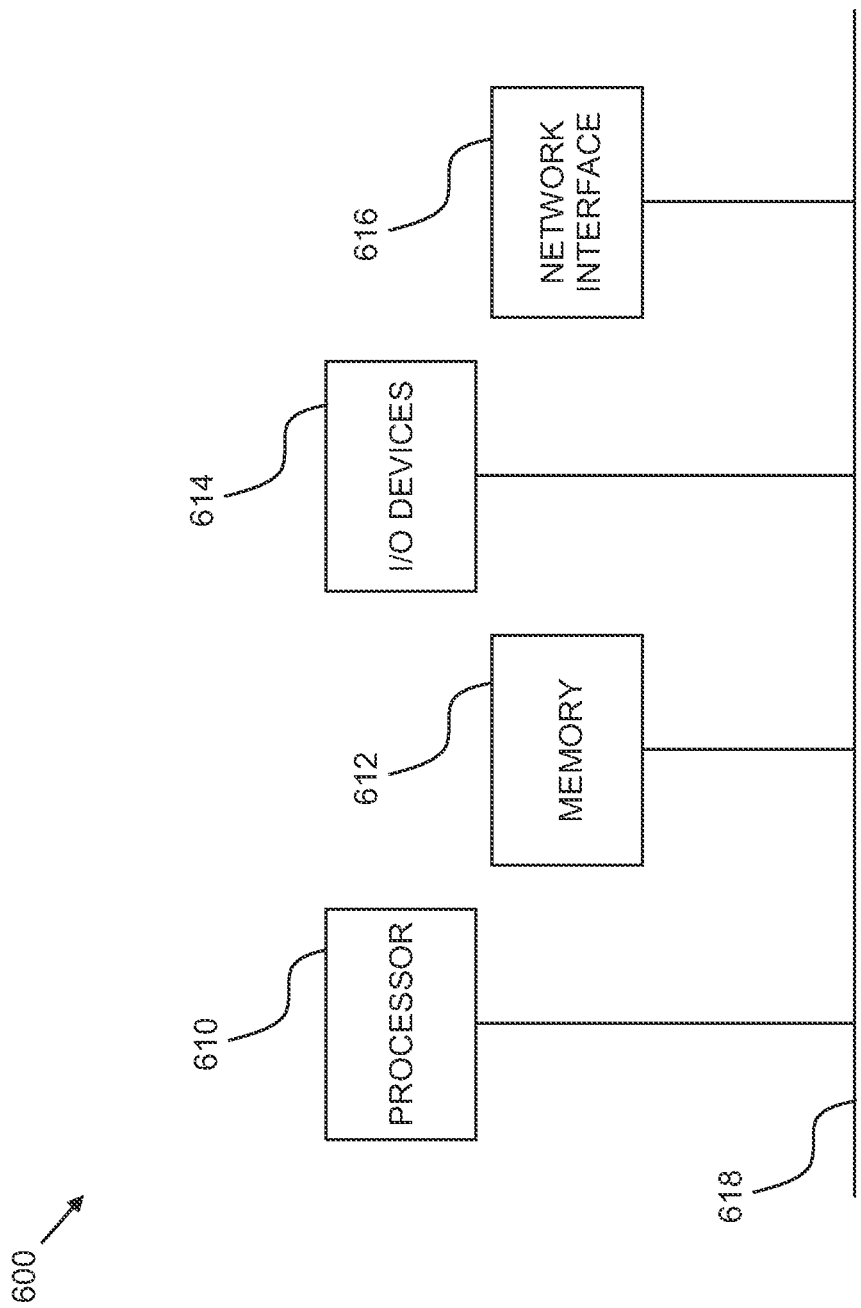
FIG. 6 is a simplified block diagram illustration of an exemplary hardware implementation of a computing system, constructed and operative in accordance with an embodiment of the invention.

Referring now to FIG. 6, block diagram 600 illustrates an exemplary hardware implementation of a computing system in accordance with which one or more components/methodologies of the invention (e.g., components/methodologies described in the context of FIGS. 1-5) may be implemented, according to an embodiment of the invention.

As shown, the techniques for controlling access to at least one resource may be implemented in accordance with a processor 610, a memory 612, I/O devices 614, and a network interface 616, coupled via a computer bus 618 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for detecting security vulnerabilities in web applications, the method comprising:
    interacting with a web application at a computer server during its execution at the computer server;
    identifying client-side instructions provided by the web application responsive to an interaction with the web application, where the client-side instructions are configured to be implemented by a client computer that receives the client-side instructions from the computer server;
    evaluating the client-side instructions, and
    identifying a security vulnerability associated with the client-side instructions.

2. The method of claim 1 and further comprising identifying a security vulnerability associated with the web application.

3. The method of claim 1 where the evaluating step comprises performing static analysis of the client-side instructions to identify the security vulnerability associated with the client-side instructions.

4. The method of claim 1 where the evaluating step comprises performing dynamic taint analysis on the client-side instructions to track taint propagation within the client-side instructions, thereby identifying the security vulnerability associated with the client-side instructions.

5. The method of claim 4 and further comprising modifying the client-side instructions to store information indicating whether variables within the client-side instructions point to tainted objects, and
    where the evaluating step comprises performing dynamic taint analysis on the modified client-side instructions to track taint propagation within the modified client-side instructions, thereby identifying the security vulnerability associated with the client-side instructions.

6. The method of claim 4 where the evaluating step comprises using a predefined security specification to determine which objects within the client-side instructions are tainted and how taint propagates from variable to variable within the client-side instructions.

7. The method of claim 4 where the evaluating step comprises performing dynamic taint analysis on the client-side instructions by calling an interpreter, that is configured to track any variable within the client-side instructions that directly points to a tainted object within the client-side instructions, to track taint propagation within the client-side instructions, thereby identifying the security vulnerability associated with the client-side instructions.

8. The method of claim 7 where the evaluating step comprises performing dynamic taint analysis where the interpreter is configured to track any variable that ultimately depends from any variable within the client-side instructions that directly points to a tainted object within the client-side instructions.

9. The method of claim 7 where the evaluating step comprises performing dynamic taint analysis where the interpreter is configured to use a predefined security specification to determine which objects within the client-side instructions are tainted and how taint propagates from variable to variable within the client-side instructions.

10. The method of claim 4 and further comprising performing symbolic analysis of the client-side instructions to determine at least one value for at least one variable within the client-side instructions that would result in a control flow target being reached within the client-side instructions during execution of the client-side instructions,
    where the evaluating step comprises using any value determined by the symbolic analyzer when performing the dynamic taint analysis on the client-side instructions to cause the target control flow.

* * * * *